(12) United States Patent
Uehara et al.

(10) Patent No.: US 9,673,461 B2
(45) Date of Patent: Jun. 6, 2017

(54) FUEL CELL

(75) Inventors: Shigetaka Uehara, Kamakura (JP); Hidetaka Nishimura, Yokosuka (JP); Kazuhiro Kageyama, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 564 days.

(21) Appl. No.: 13/993,476

(22) PCT Filed: Nov. 7, 2011

(86) PCT No.: PCT/JP2011/075589
§ 371 (c)(1),
(2), (4) Date: Jun. 12, 2013

(87) PCT Pub. No.: WO2012/081333
PCT Pub. Date: Jun. 21, 2012

(65) Prior Publication Data
US 2013/0273449 A1    Oct. 17, 2013

(30) Foreign Application Priority Data
Dec. 17, 2010    (JP) ................. 2010-281494

(51) Int. Cl.
*H01M 8/04*        (2016.01)
*H01M 8/04291*     (2016.01)
*H01M 8/2483*      (2016.01)
*H01M 8/1018*      (2016.01)
*H01M 8/241*       (2016.01)

(52) U.S. Cl.
CPC ..... *H01M 8/04291* (2013.01); *H01M 8/2483* (2016.02); *H01M 8/241* (2013.01); *H01M 2008/1095* (2013.01)

(58) Field of Classification Search
CPC ................................ H01M 8/04291
See application file for complete search history.

(56) References Cited

U.S. PATENT DOCUMENTS

2008/0145741 A1    6/2008  Kimura et al.
2011/0008690 A1    1/2011  Kagami et al.

FOREIGN PATENT DOCUMENTS

| JP | 11-354142 A | 12/1999 |
|---|---|---|
| JP | 2006-344461 A | 12/2006 |
| JP | 2007-128857 A | 5/2007 |
| JP | 2007-141639 A | 6/2007 |
| JP | 2009-259772 A | 11/2009 |
| JP | 2010-129479 A | 6/2010 |
| JP | 2010-129482 A | 6/2010 |
| WO | WO 2009138829 A1 * | 11/2009 .......... H01M 8/0258 |

* cited by examiner

*Primary Examiner* — Barbara Gilliam
*Assistant Examiner* — Stephan Essex
(74) *Attorney, Agent, or Firm* — Foley & Lardner LLP

(57) ABSTRACT

To prevent inflow of liquid water into a power generating portion even if the liquid water remains in a manifold, and to enable size reduction by making constant the contact or surface pressure. According to the present invention, in a fuel cell comprising a power generating section including an electrolyte membrane joined between an anode and a cathode, and a manifold to cause inflow and outflow of an hydrogen containing gas and an oxygen containing gas separately from each other to the anode and cathode; the manifold is formed with an inflow preventing portion to prevent inflow of a liquid water remaining in the manifold, into the power generating portion.

12 Claims, 6 Drawing Sheets

FUEL CELL

TECHNICAL FIELD

The present invention relates to a fuel cell or fuel cell apparatus provided with manifold or manifolds to inflow and outflow of a hydrogen containing gas and an oxygen containing gas.

BACKGROUND ART

As a fuel cell of such a kind, a patent document 1 discloses a construction under the name of "fuel cell system".

In the fuel cell system disclosed in the patent document 1, an anode exit inside manifold is enlarged in volume, in a lower region below a lower side of a reaction area of a cell forming member in a vertical direction. Accordingly, lower outlines of each separator and the electrolyte membrane of the cell forming member are shaped so as to project partly downwards in the vertical direction. The thus-formed enlarged anode exit inside manifold forms a water storing part to store a condensed water discharged from the outlet of an anode gas flow passage.

PRIOR ART LITERATURE

Patent Document(s)

Patent Document 1: JP2010-129479A

SUMMARY OF THE INVENTION

Problem to be Solved by the Invention

However, in the fuel cell system disclosed in the patent document 1, the water storing part of the enlarged anode exit inside manifold is located on the lower side in the vertical direction below the gas flow passage, so that a part of the cell forming member bulges and tends to increase the size, and the stacking structure is complicated.

Moreover, the bulging part of the cell forming member tends to cause non-uniformity in the surface pressure or contact pressure. Consequently, this structure causes performance decrease and deterioration in the sealing property, and the size increase is inevitable because of a useless region formed by the rectangular shape including the bulging part.

Therefore, it is an object of the present invention to provide a fuel cell or fuel cell apparatus to prevent inflow of liquid water even if left over in a manifold, into a power generating portion, and uniformize the contact pressure to enable the size reduction.

Means for Solving the Problem

According to the present invention, to solve the above-mentioned problem, in a fuel cell or fuel cell apparatus comprising a cell forming member which is sandwiched between a pair of separators and which includes a power generating section including an electrolyte membrane joined between an anode and a cathode, and manifolds which are formed in the cell forming member and the separators at such a position that the manifolds confront one another, and which are arranged to cause inflow and outflow of an hydrogen containing gas and an oxygen containing gas separately from each other to the anode and cathode; wherein the manifold of the cell forming member is formed with an inflow preventing portion to prevent inflow of a liquid water remaining in the manifold of the cell forming member, into the power generating portion; and wherein the manifold of the cell forming member includes a bottom located on a lower side in a gravity direction, and the inflow preventing portion is formed by forming a part of the bottom on a power generating portion's side on an upper side in the gravity direction as compared to a part of the bottom on an opposite side opposite to the power generating portion.

Effect of the Invention

According to the present invention, it is possible to prevent inflow of liquid water into a power generating portion even if the liquid water remains in a manifold for the inflow and outflow of a hydrogen containing gas and an oxygen containing gas separately from each other, and to enable size reduction by making constant the contact or surface pressure.

MODE(S) FOR CARRYING OUT THE INVENTION

Figure 1:
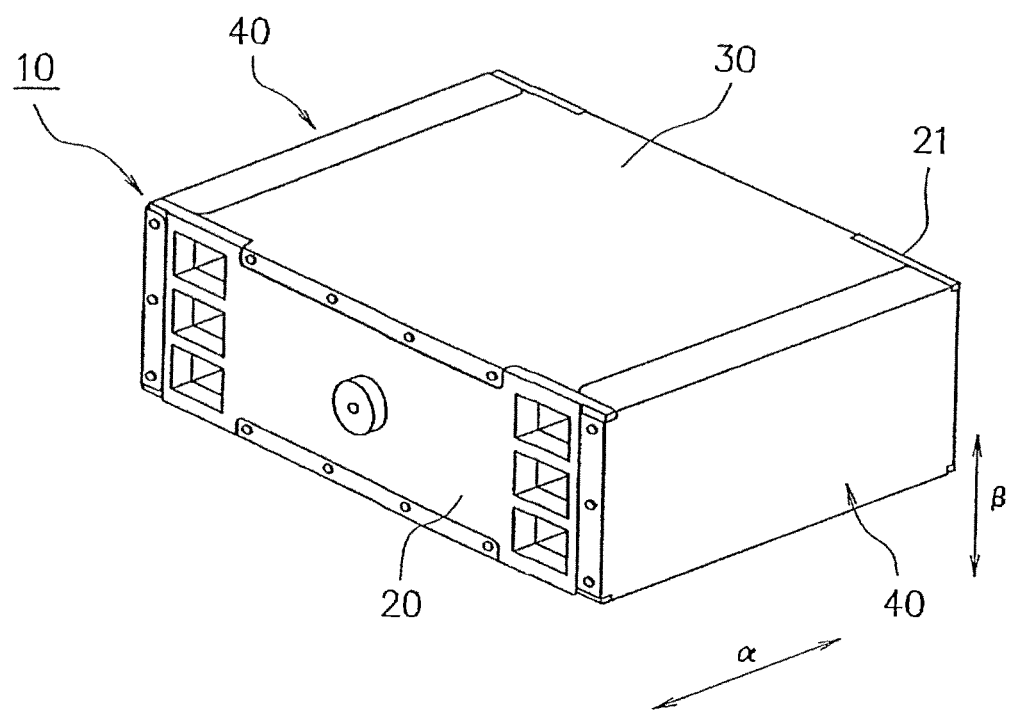
FIG. 1 is a perspective view of a fuel cell stack including a lamination of fuel cells according to a first embodiment of the present invention.
Figure 2:
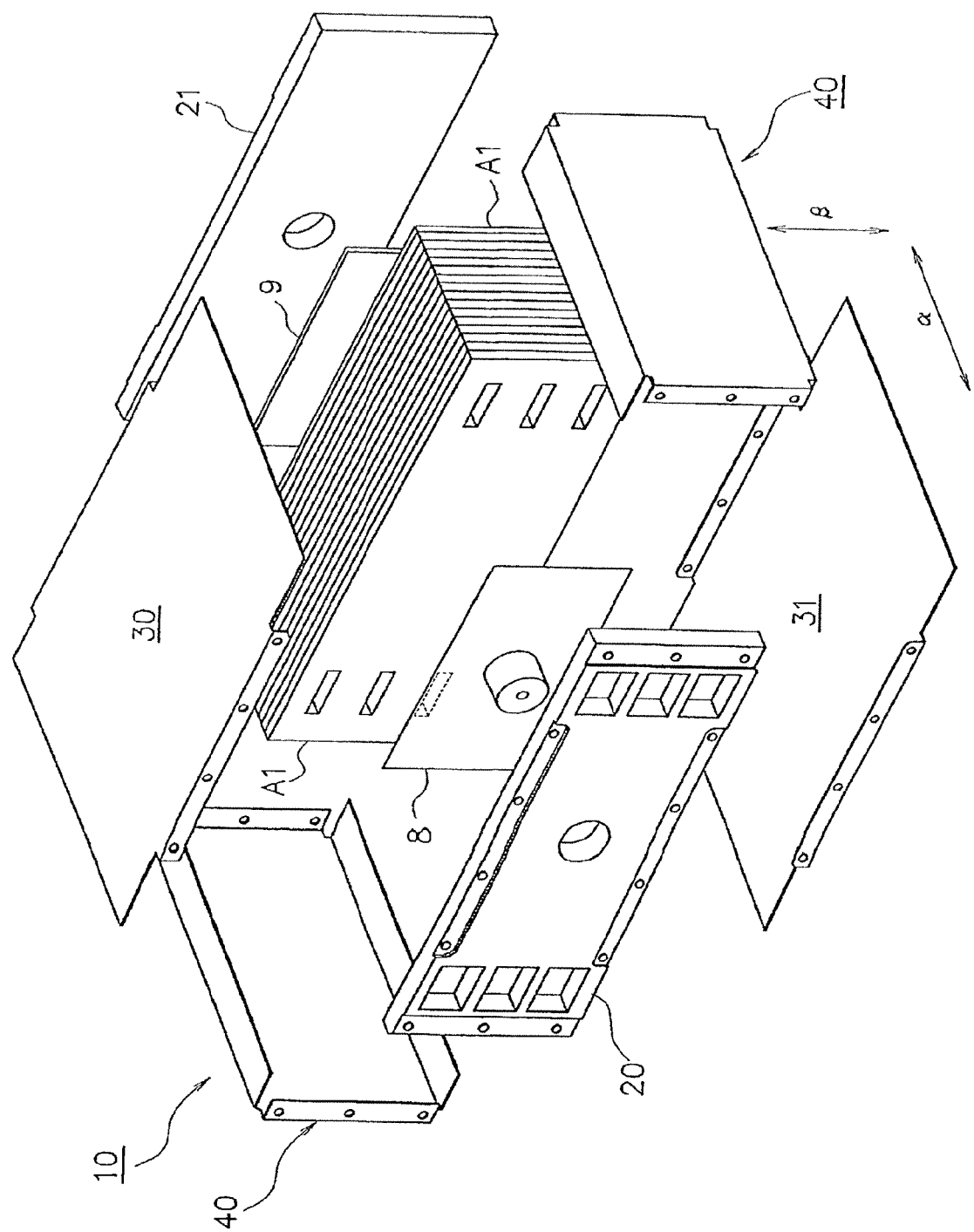
FIG. 2 is an exploded perspective view of the fuel cell stack.
Figure 3:
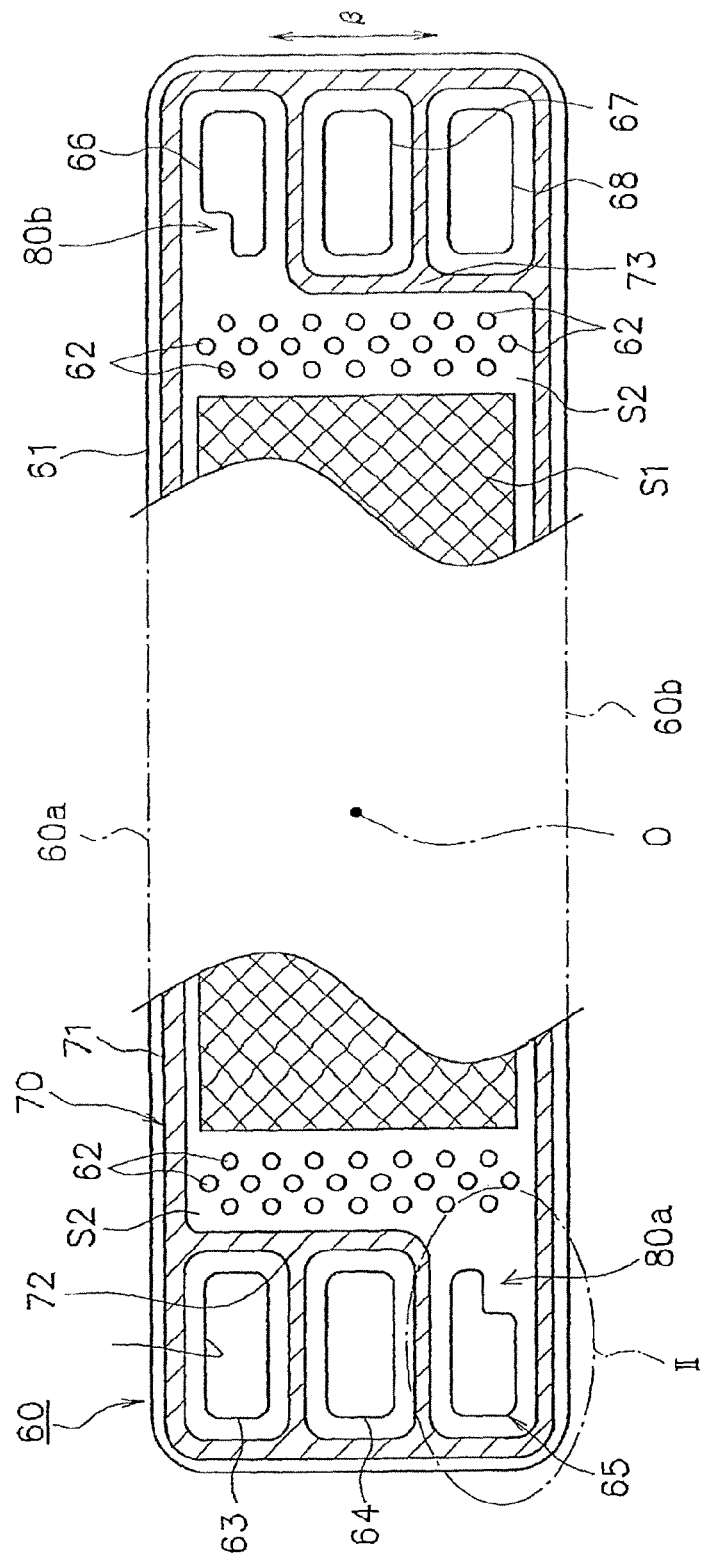
FIG. 3 is a front view of a cell forming member forming a part of the fuel cell according to the first embodiment.
Figure 4:
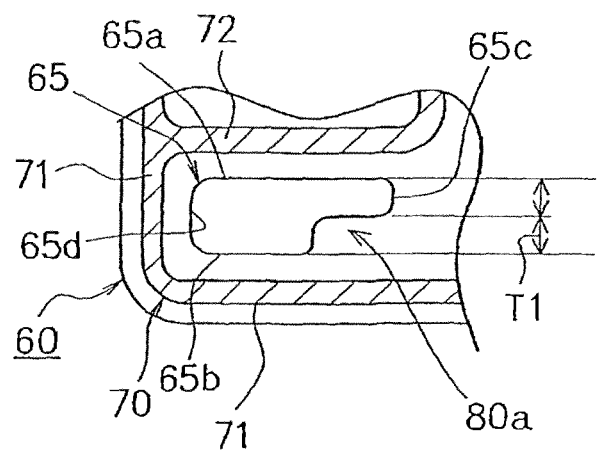
FIG. 4(A) is a partial enlarged view of a portion indicated by an envelope line II in FIG. 3.
FIG. 4(B) is a view for illustrating operation to prevent reverse flow of liquid water remaining in an anode outflow side manifold.
Figure 4:
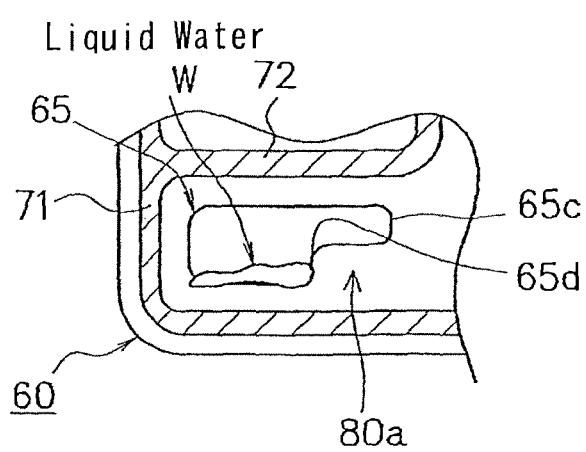
Figure 5:
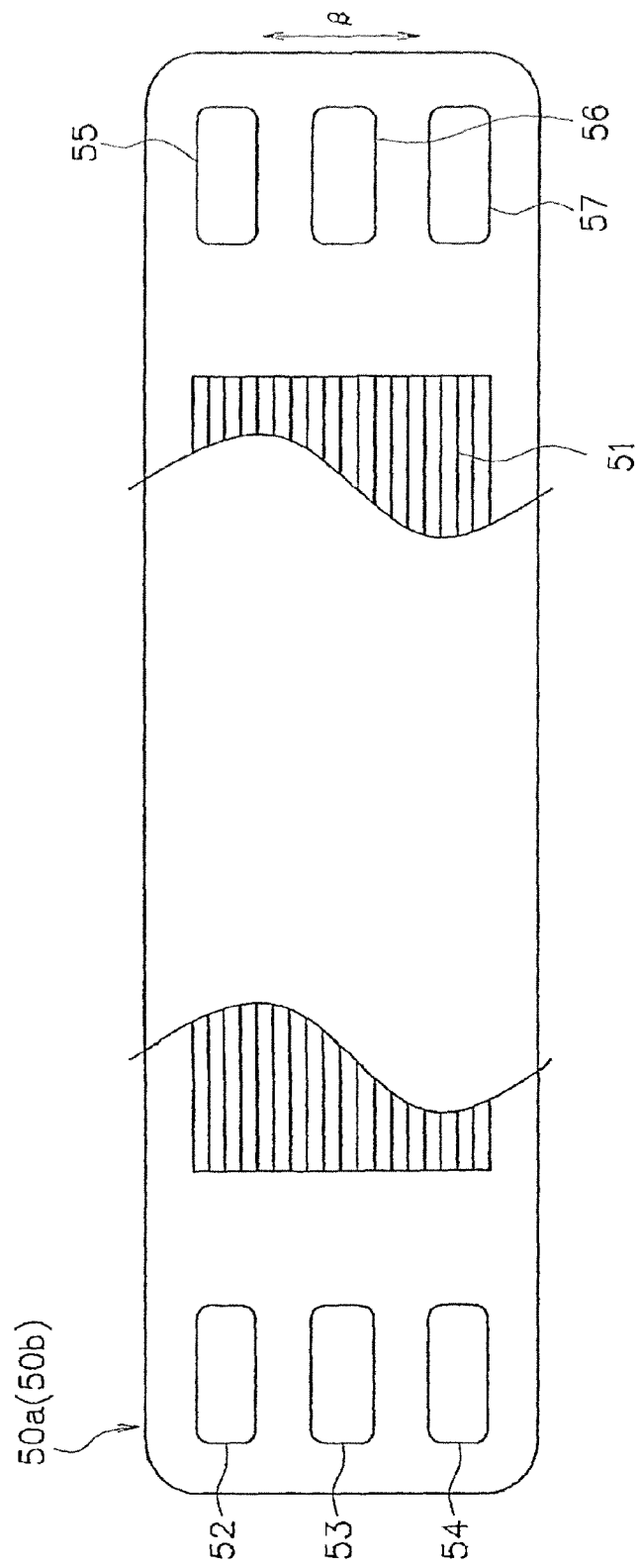
FIG. 5 is a front view of an anode side separator (cathode side separator) forming a part of the fuel cell according to the first embodiment.
Figure 6:
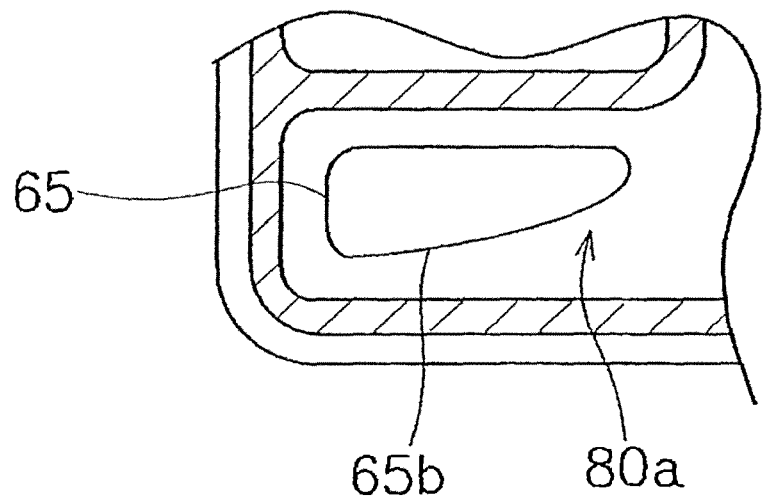
FIG. 6 is a partial enlarged view of a cell forming member forming a part of a fuel cell according to another embodiment of the present invention.

Following is detailed explanation on embodiment(s) of the present invention, with reference to the drawings. FIG. 1 is a perspective view of a fuel cell stack including a lamination of fuel cells according to a first embodiment of the present invention. FIG. 2 is an exploded perspective view of the fuel cell stack. FIG. 3 is a front view of a cell forming member forming a part of the fuel cell according to the first embodiment. FIG. 4(A) is a partial enlarged view of a portion indicated by an envelope line II in FIG. 3. FIG. 4(B) is a view for illustrating operation to prevent reverse flow of liquid water remaining in an anode outflow side manifold. FIG. 5 is a front view of an anode side separator (cathode side separator) forming a part of the fuel cell according to the first embodiment in one example.

A fuel cell stack 10 is an assembly including a plurality of fuel cells or unit cells A1 according to a first embodiment of the present invention, stacked in the form of a lamination, with a pair of end plates 20 and 21 and a pair of fastening plates 30 and 31, as shown in FIGS. 1 and 2, fastened together in a laminating direction α with a predetermined fastening force, and reinforced in a vertical direction β with a pair of reinforcing plates 40 provided on the left and right sides as viewed in the figures. There are further provided current correctors (plates) 8 and 9.

Fuel cell A1 has a structure including a cell forming member or cell component 60 shown in FIG. 3, interposed between a pair of separators 50a and 50b shown in FIG. 5.

As shown in FIG. 3, the cell forming member 60 is in the form of a rectangle long side to side as viewed in a front view from the laminating direction α. The cell forming member 60 is made up of an MEA (Membrane-Electrode Assembly) 61, and a pair of gas diffusion layers (not shown) which are made of porous material of carbon, for example, and which are laminated, respectively, on both sides of a reaction area S1 of MEA 61.

The MEA 61 is a membrane-electrode assembly including an electrolyte membrane or film joined between anode and cathode.

Specifically, MEA 61 includes the electrolyte film or membrane which is a proton conductive ion exchange membrane made of fluorine based resin provided with perfluorocarbon sulfonic acid, for example, and which shows a good electric conductivity in a wet state, and a pair of electrode catalyst layers (not shown) which are joined on both sides of the reaction area S1 of the electrolyte membrane so as to form the anode and cathode, and which are provided with catalyst for promoting an electro chemical reaction, such as platinum or alloy containing platinum and other metal. Hereinafter, the membrane electrode assembly is referred to as "power generating section" in this embodiment.

In FIG. 3, an arrow β represents the vertical direction, which is perpendicular to the direction of the arrow α.

A plurality of diffusers 62 are formed in the cell forming member 60 at both outer end portions on both sides of the power generating portion S1. The diffusers 62 have a cylindrical shape projecting integrally from the cell forming member 60, to hold spacing with the above-mentioned anode side separator 50a and cathode side separator 50b. Diffusers 62 are arranged with predetermined intervals from one another.

In this embodiment, the diffusers 62 are arranged in three rows between upper and lower edges or borders 60a and 60b. The diffusers 62 in an inner row on the inner side and an outer row on the outer side are arranged alternately with the diffusers 62 in the middle row between the inner and outer rows as viewed sidewise from one of the both ends.

In other words, in a side view viewed from one of the both ends of the cell forming member 60, the diffusers 62 of the middle row are so arranged that there is provided, between adjacent two diffusers of the inner or outer row, one diffuser of the middle row is located. In this embodiment, two regions in each of which a plurality of diffusers 62 are arranged are referred to as diffuser arrangement regions S2 and S2.

On the outer lateral side of one of the diffuser arrangement regions S2 and S2, there are formed a cathode inflow side manifold 63, a coolant inflow side manifold 64 and an anode outflow side manifold 65 which are arranged in an up and down direction. On the outer lateral side of the other of the diffuser arrangement regions S2 and S2, there are formed an anode inflow side manifold 66, a coolant outflow side manifold 67 and a cathode outflow side manifold 68 which are arranged in the up and down direction.

A seal 70 is projected to have a predetermined thickness and a predetermined width on the outer side of the cathode inflow side manifold 63, coolant inflow side manifold 64 and anode outflow side manifold 65 and the anode inflow side manifold 66, coolant outflow side manifold 67 and cathode outflow side manifold 68.

The seal 70 is a device to hold gas-tightness and liquid-tightness, with respect to the anode side separator 50a, and cathode side separator 50b. Seal 70 is made of gasket or adhesive, for example.

The above-mentioned seal 70 includes: an outer circumferential seal segment 71 extending continuously along the edges or borders of cell forming member 60; a manifold surrounding segment 72 separating and surrounding the cathode inflow side manifold 63 and the coolant inflow side manifold 64; and a manifold surrounding segment 73 separating and surrounding the coolant outflow side manifold 67 and cathode outflow side manifold 68.

Each of the anode outflow side manifold 65 and anode inflow side manifold 66 of cell forming member 60 is approximately in the form of a rectangle long in the lateral direction from side to side in a front view, and formed with an inflow preventing portion 80a or 80b.

The inflow preventing portion 80a is designed to prevent liquid water, such as condensed water, remaining in the anode outflow side manifold 65 from flowing into the power generating portion S1. Inflow preventing portion 80a is formed without bulging eccentrically out of a gas inflow and outflow path between the anode outflow side manifold 65 and the power generating portion S1.

The inflow preventing portion 80b is designed to prevent liquid water, such as condensed water, remaining in the anode inflow side manifold 66, from flowing into the power generating portion S1. Inflow preventing portion 80b is formed without bulging eccentrically out of a gas inflow and outflow path between the anode inflow side manifold 66 and the power generating portion S1. In this embodiment, the anode inflow side manifold 66 is identical in shape and size to the anode outflow side manifold 65.

Inflow preventing portion 80a is formed by forming a lower edge or border or bottom 65b of anode outflow side manifold 65 in a following manner. The lower edge 65b of anode outflow side manifold 65 is a border located on the lower side in the gravity direction. The lower edge 65b is formed so as to include an outer portion adjacent to an outer edge or border 65d of anode outflow side manifold 65 (on the side opposite to or away from the power generating portion S1), and an inner portion which is adjacent to an inner edge or border 65c of anode outflow side manifold 65 (on the side closer to the power generating portion S1), and which is located at a level above the level of the outer portion in the gravity direction.

In other words, the inner portion of the lower edge or border 65b is raised toward an upper edge or border 65a by a predetermined dimension T1 so as to form a step.

The height T1 of the raised inner portion of the lower edge 65b near the inner edge 65c is so set to prevent reverse flow of the liquid water remaining in the anode outflow side manifold 65 to the diffuser arrangement region S2 by capillary phenomenon.

As shown in FIG. 4B, the inflow preventing portion 80a can prevent the liquid water W remaining in the anode outflow side manifold 65, from flowing backwards by the capillary action when the supply of hydrogen containing gas is stopped.

The inflow preventing portion 80b is constructed in the same manner as the inflow preventing portion 80a, so that detailed explanation is omitted.

In the cell forming member 60 according to this embodiment as explained above, the forward and reverse flow preventing portions 80a and 80b are formed, in the manifolds to cause the hydrogen containing gas to flow out, in a manner of point symmetry.

This arrangement facilitates the assembly process by eliminating the need for check of the direction of assembly of cell forming member 60.

The anode side separator in one example is shown in FIG. 5. Although FIG. 5 shows the anode side separator in one example, the cathode side separator is identical in shape and size to the anode side separator, and hence detailed explanation is omitted.

The anode side separator 50$a$ is made from a thin sheet of electric conductive material. Anode side separator 50$a$ is in the form of a rectangle identical to the rectangular shape of the cell forming member 60 as viewed in a front view from the laminating direction $\alpha$.

Anode side separator 50$a$ is formed with an anode gas flow passage 51. In the inner surface of the anode side separator 50 facing toward the cell forming member 60, the anode gas flow passage 51 is formed in an area contacting with the power generating portion S1 of the cell forming member 60. The anode gas flow passage 51 is in the form of a plurality of wave forms extending from the anode inflow side manifold 66 to the anode outflow side manifold 65.

On both sides of the anode gas flow passage 51, there are formed, by opening, a cathode inflow side manifold 52, a coolant inflow side manifold 53 and an anode outflow side manifold 54; and an anode inflow side manifold 55, a coolant outflow side manifold 56 and a cathode outflow side manifold 57, respectively, at positions confronting the cathode inflow side manifold 63, coolant inflow side manifold 64 and anode outflow side manifold 65; and the anode inflow side manifold 66, coolant outflow side manifold 67 and cathode outflow side manifold 68.

The outer surface of each of the anode side and cathode side separators 50$a$ and 50$b$ is in contact with the outer surface of the anode side or cathode side separator 50$a$ or 50$b$ of another fuel cell A1 adjacent to the fuel cell A1 of FIG. 5. In either or both of the contacting outer surfaces contacting with each other, there are formed a plurality of coolant or cooling water passages (not shown) extending from the coolant inflow side manifold 53 to the coolant outflow side manifold 56 for the coolant or cooling water.

In the above-mentioned arrangement, the cathode outflow side manifold and anode inflow side manifold are provided on the same terminal side. Therefore, the anode gas in the anode gas passage and the cathode gas in the cathode gas passage flow in opposite directions on both sides of the cell forming member 60.

The fuel cell according to the above-mentioned embodiment can provide following effects.

Even when the liquid water is left behind in the manifolds to covey the hydrogen containing gas and the oxygen containing gas separately in inward and outward directions, this construction can prevent the remaining liquid water from flowing into the power generating portion and enable size reduction.

Since the entry of the liquid water remaining in the manifold into the power generating portion, this construction can solve the problem of blockade of the passages and diffusers and incapability of starting due to freezing of the remaining liquid water even in a situation where the surrounding temperature becomes lower than zero.

It is possible to make the outside shape of the fuel cell in a rectangular shape longer in the lateral direction as viewed in a front view. Therefore, it is possible to set the surface contact pressure constant or uniform and thereby improve the sealing performance.

With the inflow preventing portion provided in the outflow side manifold where the liquid water tends to be left over, this construction can prevent more effectively the reverse flow and freezing of the liquid water remaining in the outflow side manifold.

In the arrangement in which the outflow side manifold is located on a lower side in the gravity direction, the liquid water tends to be discharged to the outflow side manifold during operation. Therefore, the inflow of the gas is not readily obstructed since the liquid water is not left over in the fluid passage. Moreover, after the stoppage of the gas, the inflow preventing portion prevents the inflow of the liquid water. Therefore, this fuel cell construction enables a starting operation at a subzero temperature, and makes it possible to prevent the inflow of liquid water into the power generating portion even if the vehicle including the fuel cell is stopped in the state inclined leftward or rightward.

In the above-mentioned embodiment, the anode outflow side manifold and anode inflow side manifold are provided with the inflow preventing portions as an example. However, it is optional to provide inflow preventing portion or portions in either or both of the cathode outflow side manifold and cathode inflow side manifold.

Moreover, in the above-mentioned embodiment, the diffusers and seal line are provided in the MEA, as an example. However, it is optional to employ an arrangement in which the diffusers and seal line or either of the diffusers and the seal line are provided on the separator's side.

EXPLANATION OF REFERENCE NUMERALS

63 cathode inflow side manifold
64 coolant inflow side manifold
65 anode outflow side manifold
66 anode inflow side manifold
67 coolant outflow side manifold
68 cathode outflow side manifold 68
80$a$, 80$b$ inflow preventing portion
A1, A2 fuel cell

The invention claimed is:

1. A fuel cell comprising:
a pair of separators;
a cell forming member sandwiched between the pair of separators, the cell forming member including a power generating portion including an electrolyte membrane joined between an anode and a cathode;
manifolds formed in the cell forming member and the pair of separators at such a position that the manifolds confront one another, the manifolds being arranged to allow inflow and outflow of a hydrogen containing gas and an oxygen containing gas separately from each other to the anode and cathode; and
a diffuser arrangement region extending from the manifolds to the power generating portion,
wherein a manifold of the cell forming member includes an inflow preventing portion configured to prevent an inflow of a liquid water remaining in the manifold of the cell forming member into the power generating portion,
wherein the inflow preventing portion is formed without bulging into the diffuser arrangement region,
wherein the manifold of the cell forming member includes a bottom located on a lower side of the manifold in a gravity direction, the bottom having an inner portion and an outer portion, the inner portion located closer to the power generating portion than the outer portion, and
wherein the inflow preventing portion is formed by forming the bottom such that the inner portion of the bottom is located at a higher position in the gravity direction than the outer portion of the bottom.

2. The fuel cell as recited in claim 1, wherein the inflow preventing portion comprises a step formed in the bottom of the manifold.

3. The fuel cell as recited in claim 1, wherein the inflow preventing portion is provided in at least two of the manifolds.

4. The fuel cell as recited in claim 3, wherein the inflow preventing portion is provided in one of the manifolds that is adjacent to the anode and provided for outflow of the hydrogen containing gas.

5. The fuel cell as recited in claim 3, wherein the inflow preventing portion is provided in one of the manifolds that is adjacent to the cathode and provided for outflow of the oxygen containing gas.

6. The fuel cell as recited in claim 1, wherein the fuel cell is formed by lamination so that the manifold provided with the inflow preventing portion is located on a lower side in the gravity direction.

7. The fuel cell as recited in claim 1, wherein a plurality of manifolds are each provided with the inflow preventing portion, and the plurality of manifolds are arranged in a manner of point symmetry.

8. The fuel cell as recited in claim 2, wherein the inflow preventing portion is provided in at least two of the manifolds.

9. The fuel cell as recited in claim 4, wherein the inflow preventing portion is provided in one of the manifolds that is adjacent to the cathode and provided for outflow of the oxygen containing gas.

10. The fuel cell as recited in claim 1, wherein the inflow preventing portion comprises a raised portion formed inside the manifold of the cell forming member.

11. The fuel cell as recited in claim 1, wherein the inflow preventing portion is formed only in the cell forming member and the manifolds of the separators are formed with no inflow preventing portion.

12. The fuel cell as recited in claim 1, wherein the manifold of the cell forming member further includes an upper border opposite to the bottom, an outer border extending from the outer portion of the bottom to the upper border, and an inner border extending from the inner portion of the bottom to the upper border, the inner border being closer to the power generating portion than the outer border, the bottom, the outer border, the upper border and the inner border are connected end to end to form a closed cross sectional shape of the manifold of the cell forming member to prevent the inflow of the liquid water to the power generating portion, a length of the inner border is shorter than a length of the outer border, and the inner portion of the bottom is raised toward the upper border so that a distance from the inner portion of the bottom to the upper border is smaller than a distance from the outer portion of the bottom to the upper border.

* * * * *